United States Patent
Nambara et al.

(10) Patent No.: US 8,821,092 B2
(45) Date of Patent: Sep. 2, 2014

(54) FASTENING MEMBER AND COMPRESSOR APPARATUS

(71) Applicant: Hitachi Automotive Systems, Ltd., Ibaraki (JP)

(72) Inventors: Shogo Nambara, Kanagawa (JP); Hiroshi Fukudome, Kanagawa (JP); Kazuhisa Yama, Kanagawa (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 0 days.

(21) Appl. No.: 13/837,805

(22) Filed: Mar. 15, 2013

(65) Prior Publication Data

US 2013/0259596 A1 Oct. 3, 2013

(30) Foreign Application Priority Data

Mar. 30, 2012 (JP) ................... 2012-082036

(51) Int. Cl.
| | | |
|---|---|---|
| *F16B 39/00* | (2006.01) | |
| *F04B 39/00* | (2006.01) | |
| *F16B 5/02* | (2006.01) | |
| *F16B 33/00* | (2006.01) | |
| *B60H 1/32* | (2006.01) | |

(52) U.S. Cl.
CPC ............ *F16B 39/00* (2013.01); *F04B 39/0044* (2013.01); *F16B 5/0241* (2013.01); *F16B 33/002* (2013.01); *B60H 1/3229* (2013.01); *F16B 5/0258* (2013.01)
USPC ............................. 411/166; 411/169; 411/398

(58) Field of Classification Search
USPC .............. 411/166, 169, 366.1, 367–368, 383, 411/398, 411, 424
See application file for complete search history.

(56) References Cited

U.S. PATENT DOCUMENTS

| | | | | | |
|---|---|---|---|---|---|
| 2,359,046 | A | * | 9/1944 | Miller | 411/368 |
| 2,458,382 | A | * | 1/1949 | Hutchison, Jr. | 73/12.04 |
| 3,747,168 | A | * | 7/1973 | Snarskis | 411/349 |
| 4,435,100 | A | * | 3/1984 | Cox | 403/27 |
| 5,234,236 | A | * | 8/1993 | Gromotka | 292/194 |
| 5,413,442 | A | * | 5/1995 | Grey | 411/366.3 |
| 6,231,321 | B1 | * | 5/2001 | Fukudome et al. | 417/502 |
| 6,461,092 | B2 | * | 10/2002 | Tseng | 411/383 |
| 7,661,916 | B2 | * | 2/2010 | Downey | 411/354 |
| 7,874,777 | B1 | * | 1/2011 | Howie, Jr. | 411/368 |
| 2006/0104825 | A1 | * | 5/2006 | Etter et al. | 417/234 |
| 2007/0252314 | A1 | | 11/2007 | Yama et al. | |
| 2012/0263557 | A1 | * | 10/2012 | Spencer et al. | 411/366.1 |

FOREIGN PATENT DOCUMENTS

JP  2008-106927  5/2008

* cited by examiner

*Primary Examiner* — Roberta Delisle
(74) *Attorney, Agent, or Firm* — Wenderoth, Lind & Ponack, LLP

(57) ABSTRACT

A fastening member includes a bolt and a nut for attaching a compressor to a vehicle body. A non-circular relative rotation prevention portion is formed below a head portion of the bolt. A washer is non-rotatably press fitted around the relative rotation prevention portion. Before the attachment, the head portion and the washer are temporarily fixed with a space generated therebetween. An elastic body, which is attached to the compressor, is disposed between the washer and the nut. A cylindrical member is provided at an inner circumference of the elastic body. As a result, when the nut is screwed, an axial force of the nut is transmitted to the washer via the cylindrical member, and the space between the washer and the head portion is reduced, completing the attachment.

20 Claims, 8 Drawing Sheets

FASTENING MEMBER AND COMPRESSOR APPARATUS

BACKGROUND OF THE INVENTION

The present invention relates to a fastening member for use in attachment of an apparatus that generates a vibration such as a compressor apparatus and provided with a function of damping the vibration, and a compressor apparatus.

As a suspension apparatus mounted on an automobile, there is an air suspension apparatus capable of adjusting a vehicle height by supplying and releasing compressed air to and from an air spring with use of a compressor apparatus. As one type of the air suspension apparatus, there is an air suspension apparatus employing a vibration absorber to fasten a bracket attached to the compressor apparatus to a vehicle body side so as not to transmit a vibration of the compressor apparatus in operation to the vehicle body side, as disclosed in, for example, Japanese Patent Public Disclosure No. 2008-106927.

SUMMARY OF THE INVENTION

On the other hand, for example, in a case where the compressor apparatus or the like is fastened to a bottom surface of the vehicle body with use of a bolt-like fastening member, workability of fastening the compressor apparatus may be undesirable, due to, for example, poor visibility around an attachment hole formed at the vehicle body for attaching the compressor apparatus, depending on the vehicle.

Therefore, an object of the present invention is to provide a fastening member and a compressor apparatus that can improve workability of fastening.

To achieve the above-described and other objects, an aspect of the present invention provides a fastening member for use in coupling between one side member including a non-circular attachment hole having an opening portion formed at a part of a circumference of the non-circular attachment hole, and an opposite side member including an insertion hole. The fastening member includes a bolt including a shaft portion configured to be inserted in the attachment hole from the opening portion of the attachment hole and having a male screw formed at least a distal end side of the shaft portion, and a head portion formed at a proximal end side of the shaft portion and configured so as to be unable to pass through the attachment hole when the shaft portion is inserted through the attachment hole. The shaft portion is configured in such a manner that the opposite member is attached to the shaft portion. The fastening member further includes a washer including a through-hole, through which the shaft portion of the bolt is inserted. The washer is configured to be prevented from rotating relative to the bolt and sandwich the one side member between the washer and the head portion. The fastening member further includes a nut configured to be screwed with the bolt and configured to couple the one side member and the opposite side member. The shaft portion of the bolt includes a non-circular relative rotation prevention portion at a head portion side of the shaft portion. The relative rotation prevention portion is configured to abut against the non-circular attachment hole in a rotational direction to prevent a relative rotation between the bolt and the one side member.

Another aspect of the present invention, a compressor apparatus includes a compression unit configured to compress air, a frame to which the compression unit is attached, an insertion hole formed at the frame, a cylindrical elastic body configured to be inserted in the insertion hole to be engaged with the insertion hole at an outer circumference thereof, a bolt configured to be inserted in the elastic body and including a head portion formed at a proximal end side of a shaft portion and a male screw formed at a distal end side of the shaft portion, a nut configured to be screwed with the bolt, and a washer including a through-hole, through which the shaft portion of the bolt is inserted. The washer is configured to be prevented from rotating relative to the bolt and to sandwich an area surrounding a non-circular attachment hole formed at an attachment target member, to which the compressor apparatus is attached, between the washer and the head portion. The shaft portion of the bolt includes a non-circular relative rotation prevention portion at a head portion side of the shaft portion. The relative rotation prevention portion is configured to abut against the non-circular attachment hole in a rotational direction to prevent a relative rotation between the bolt and the one side member.

DETAILED DESCRIPTION OF THE PREFERRED EMBODIMENTS

Figure 1:
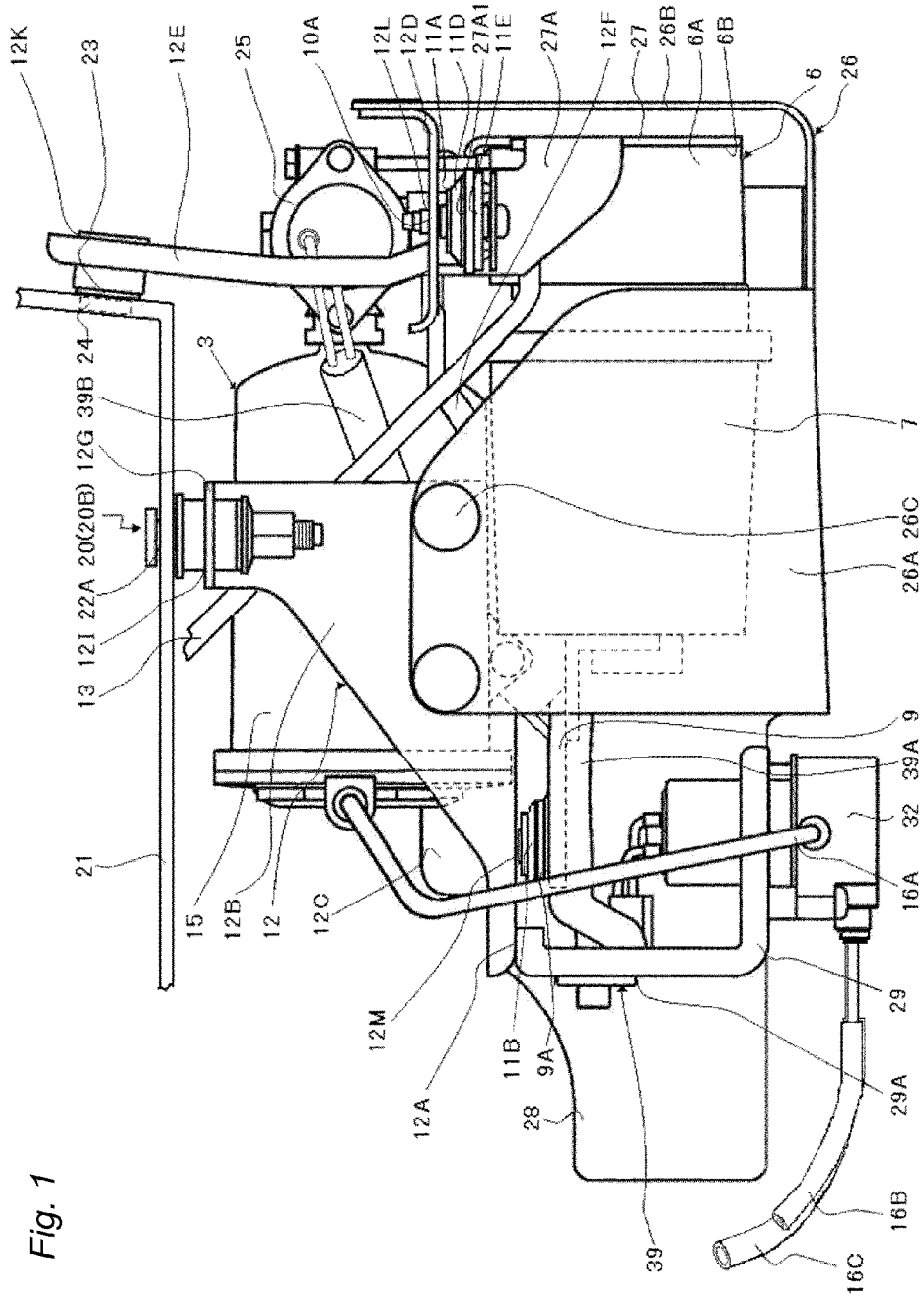
FIG. 1 is a front view of a compressor apparatus to which a fastening member according to an embodiment of the present invention is employed.

An exemplary embodiment that will be described below can not only achieve the objects and provide the effects as described in the above paragraphs "BACKGROUND OF THE INVENTION" and "SUMMARY OF THE INVENTION", but also achieve other various objects and provide other various effects.

The followings are main objects to be achieved by the exemplary embodiment that will be described below, although some of them have been already described above.

[Improvement of Workability]

When a compressor apparatus is attached to a bottom surface of a vehicle body side of an automobile from below with use of a bolt-like fastening member, a worker should attach the compressor apparatus to an attachment hole in such an environment that the worker cannot see anything other than the attachment hole of the vehicle body side at all.

In this case, one possible measure to facilitate the attachment of the compressor apparatus is to provide an attachment hole including an opening portion at the vehicle body side, temporarily fix a bolt and nut to a bracket of the compressor apparatus side in advance, and performing the attachment work by inserting a head portion of the bolt into the attachment hole from the opening portion and sliding the bolt to the attachment hole side.

However, in this case, if the bolt rotates at the time of screwing the nut, this leads to lack of a sufficient screwing force. A possible measure against it is to provide a non-circular relative rotation prevention portion at a proximal end side of the bolt. However, in a case where the relative rotation prevention portion is provided to the bolt, misalignment between rotational positions of the attachment hole and the relative rotation prevention portion makes it impossible to slide the bolt from the opening portion to the attachment hole side. Nevertheless, the visibility around the attachment hole is not good, leading to a problem of a difficulty in positioning of the bolt in the rotational direction. Therefore, there is a demand for developing a fastening member having improved assemblability.

Further, in a case where the relative rotation prevention portion is formed at a shaft portion of the above-described bolt so as to have a portion larger in diameter than the shaft portion, and a washer is provided between the bolt and a nut, screwing the nut with the washer in abutment with a lower end of the relative rotation prevention portion may result in an attachment failure with a considerable space generated between the washer and a head portion.

[Further Effective Prevention of Transmission of Vibration of Vibrator to Attachment Target Member]

For automobiles, further reductions in noises and vibrations are demanded. Therefore, for automobiles employing an air suspension apparatus as a suspension apparatus thereof, it is demanded to develop a vibration absorber capable of preventing transmission of vibrations of a compressor, which supplies compressed air to the air suspension, to the vehicle side.

Embodiment

Hereinafter, an embodiment of the present invention will be described in detail with reference to the accompanying drawings. In the following description, for facilitating better understanding, the bottom side in the drawings is defined as one side or a bottom side, and conversely, the top side in the drawings is defined as the other side or a top side. Further, the left side and the right side in the drawings are defined as a left side and a right side, respectively.

Figure 3:
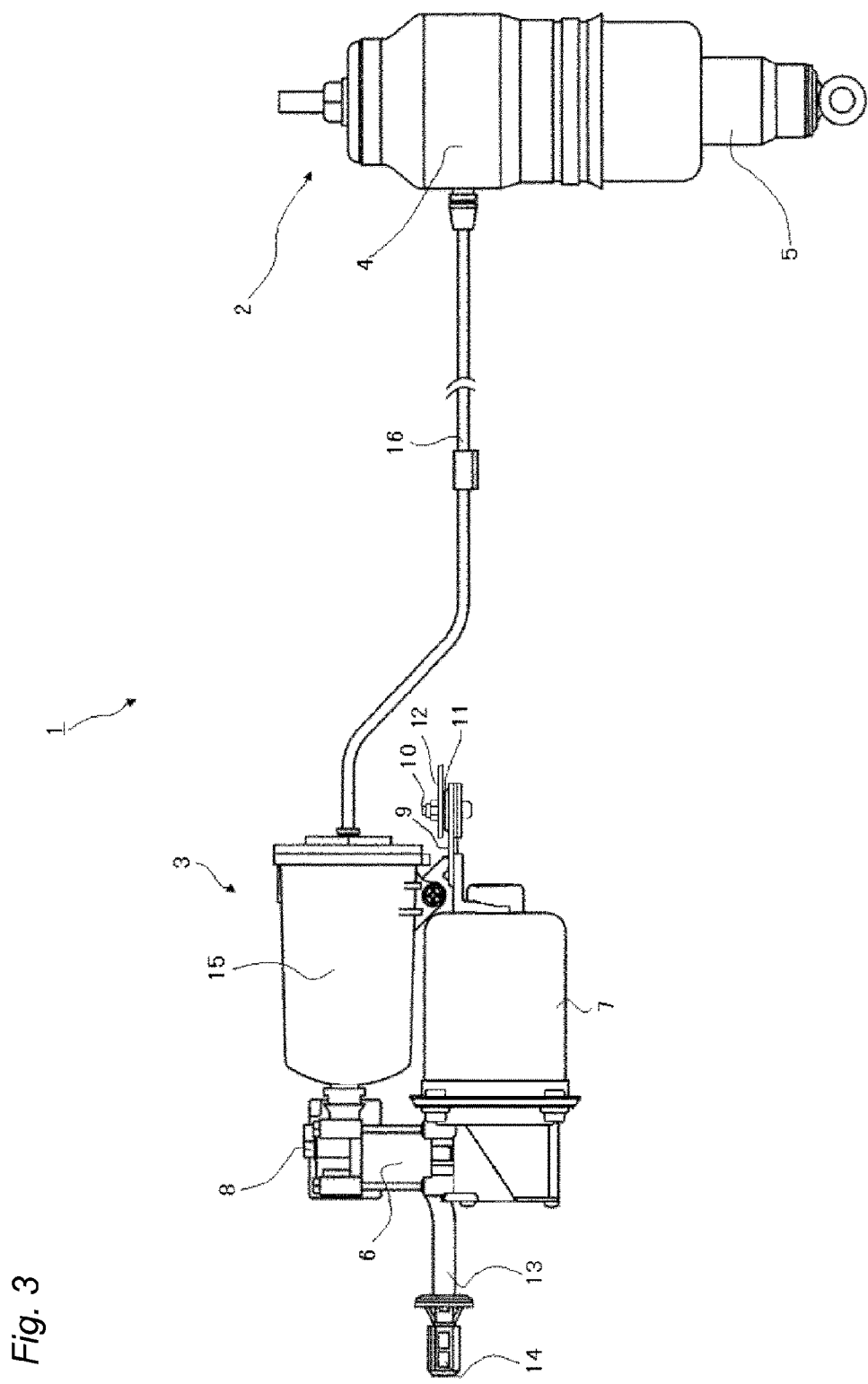
FIG. 3 illustrates how the compressor apparatus according to the embodiment of the present invention is used for an air suspension.

First, an air suspension apparatus of an automobile to which a fastening member according to the present embodiment is employed will be described with reference to FIG. 3. FIG. 3 illustrates only a part of a compressor unit protector 12, which is an attachment member for attachment of a compressor unit 3 to a vehicle body.

As illustrated in FIG. 3, an air suspension apparatus 1 includes an air suspension 2 disposed between a sprung side and an unsprung side, i.e., a vehicle body and a wheel, and the compressor unit 3 for supplying and releasing compressed air to and from the air suspension 2.

The air suspension 2 includes an air spring 4 and a shock absorber 5, which are integrated to constitute the air suspension 2. The air spring 4 is a suspension spring that supports the vehicle body with use of its spring force. The compression unit 3 supplies or releases the compressed air, by which the air spring 4 can adjust a vehicle height. Further, the shock absorber 5 functions to damp a vibration between the sprung side and the unsprung side.

The compressor unit 3 includes a compressor (or compression unit) 6, a motor 7 that drives the compressor 6, an air dryer 15 connected to an outlet port of the compressor 6 to adsorb moisture of the compression air, and a supply/release control valve 8 that controls supply and release of the compression air to and from the air spring 4. The compressor 6, the motor 7, the air dryer 15, and the supply/release control valve 8 are integrally coupled to one another. Three brackets 9, 27A, and 27B are attached to the compressor unit 3. The brackets 9, 27A, and 27B are each coupled to the compressor unit protector 12 as a frame and an opposite side member connected to the vehicle body side by a screw member 10 via a vibration absorber 11. FIG. 3 illustrates only a single vibration absorber 11, but the bracket 9 and the compressor unit protector 12 are coupled at three positions via the vibration absorbers 11.

This compressor unit 3 and the compressor unit protector 12 as the frame constitute a compressor apparatus.

A flexible air intake tube 13, and an air intake filter 14 are connected to an inlet port of the compressor 6. The air dryer 15, which is disposed at the outlet side of the compressor 6, is connected to the air spring 4 of the air suspension 2 disposed at each wheel through an air line 16 via not-illustrated branching. An open/close valve is disposed between the air line 16 and the air spring 4 beyond the branching to allow the vehicle height to be adjusted for each wheel.

Next, the compressor apparatus according to the present invention will be described with reference to FIGS. 1 and 2.

A vehicle body side panel 21 is a body or a frame of a monocoque of the vehicle, and constitutes a one side member and an attachment target member.

The compressor unit protector 12 is coupled to the vehicle body side panel 21 via two fastening members 20 (20A and 20B), by which the compressor unit 3 is attached to the vehicle.

Next, the compressor unit protector 12, which is coupled to the vehicle body side panel 21 via the fastening members 20 and constitutes the opposite side member and the frame, will be described.

Figure 2:
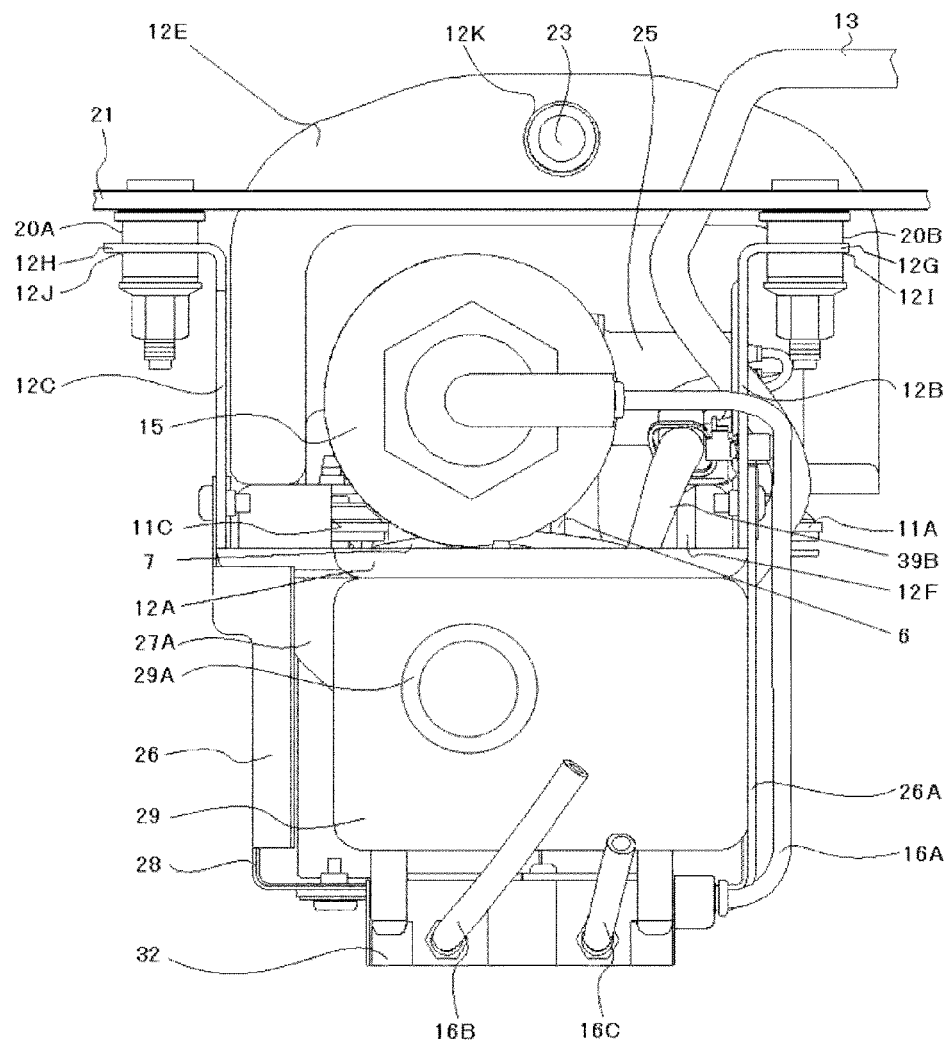
FIG. 2 is a side view of the compressor apparatus to which the fastening member according to the embodiment of the present invention is employed.

As illustrated in FIGS. 1 and 2, the compressor unit protector 12 generally includes a U-shaped first bottom portion 12A, two right-side side portion 12B and left-side side portion 12C, two left and right second bottom portions 12D, and an inverted U-shaped arm portion 12E. The first bottom portion 12A is disposed between the air dryer 15 and the motor 7. The side portions 12B and 12C extend upward from both the right and left side of the first bottom portion 12A as viewed in FIG. 2. The second bottom portions 12D are disposed at the two tip sides of the U shape of the first bottom portion 12A, and are positioned at upper sides relative to the first bottom portion 12A via ramp portions 12F. The arm portion 12E connects the two second bottom portions 12D.

Bracket portions 12G and 12H, which are bent to extend in the horizontal direction as viewed in FIG. 2, are formed at the upper ends of the right-side side portion 12B and the left-side side portion 12C. Insertion holes 12I and 12J, which are constituted by circular holes, are formed at the bracket portions 12G and 12H, respectively.

Further, a circular hole 12K is formed at the arm portion 12E. A vibration absorbing bush 23, which will be described below, is provided at the circular hole 12K. Further, a hole 12M is formed at the bottom portion of the U shape of the first bottom portion 12A. A vibration absorber 11B is attached to the hole 12 M. Holes 12L and 12N are formed at the two left and right second bottom portions 12D. Vibration absorbers 11A and 11C are attached to the holes 12L and 12N, respectively.

A crank case bracket 27 is provided at an end surface 6B of a crank case 6A of the compressor 6. Brackets 27A and 27B are integrally formed at the crank case bracket 27. The brackets 27A and 27B extend upward from both sides of the crank case 6A. A hole 27A1 is formed at the bracket 27A. Further, a hole 9A is also formed at the bracket 9 disposed at an end surface of the motor 7. The vibration absorber 11B is attached to the holes 9A and 12M by the spring member 10. The vibration absorber 11A is attached to the holes 27A1 and 12L by the spring member 10 (10A). Further, the vibration absorber 11C is attached to a position opposite from the vibration absorber 11A, although not illustrated. As a result, the compression apparatus is configured to prevent direct transmission of a vibration of the compressor unit 3 to the compressor unit protector 12, thereby also preventing the transmission of this vibration to the vehicle body side panel 21.

Besides the above-described members, a motor protector 26, an extension protector 28, and a connector bracket 29 are provided at the compressor unit protector 12. The motor protector 26 protects the motor from heat externally supplied from, for example, a muffler, or an incoming stone. Connectors and the like are attached to the connector bracket 29.

Now, the vibration absorber 11 will be described in detail based on the vibration absorber 11A. The vibration absorber 11A is configured to be fixed to the second bottom portion 12D by an upper bush 11D fitted in the hole 12L of the second bottom portion 12D of the compressor unit protector 12, a lower bush 11E in abutment with the hole 12L, and a screw member 10A inserted through the upper bush 11D and the lower bush 11E.

The circular hole 12K is formed at one side of the arm portion 12E. The vibration absorbing bush 23, which will be described below, is provided at the circular hole 12K. The other ends of the arm portion 12E are integrally attached to the both ends of the second bottom portions 12D by means of, for example, welding. Further, the arm portion 12E is fastened to the vehicle body side panel 21 via the vibration absorbing bush 23 disposed at the hole 12K. The present embodiment is configured in such a manner that the vibration absorbing bush 23, which is made of a rubber material larger in diameter than the diameter of a bush attachment hole 24 of the vehicle body side panel 21 in a natural condition, is press fitted in the circular hole 12K. However, the vibration absorbing bush 23 is not limited to a bush made of a rubber material, and may be embodied by, for example, the vibration absorber 11.

Next, the motor protector 26, which is connected to the compressor unit protector 12 to protect the compressor 6 and the motor 7, will be described. The motor protector 26 includes a motor cover portion 26A, and a compressor cover portion 26B. The motor cover portion 26A covers the side surface of the motor 7. The compressor cover portion 26B protects the compressor 6 as a compression unit and is connected to the second bottom portion 12D of the compressor unit protector 12. The motor cover portion 26A has one side integrally connected to the compressor cover portion 26B, and the other side fastened to the side of the compressor unit protector 12 by a plurality of screws 26C. The motor cover portion 26A and the compressor cover portion 26B are configured so as to be separated from each other except for the bottom portions thereof. The motor cover portion 26A and the compressor cover portion 26B do not surround the compressor 6 and the motor 7 along a whole circumference, thereby facilitating a release of heat of the compressor 6 and the motor 7 to the outside. As a result, it is possible to improve durability and reliability of the compressor 6 and the motor 7 while reducing the weight of the compressor apparatus. Further, the compressor protector 27 and the motor 7 are disposed with some space generated therebetween, further facilitating a release of heat to the outside.

Next, the crank case bracket 27 will be described.

The crank case bracket 27 and the crank case 6A are coupled to each other by, for example, screws at four positions, although not illustrated. The crank case bracket 27 functions as a protector of the compressor 6 and a bracket of the vibration absorber 11A.

Next, the extension protector 28 will be described. The extension protector 28 is made of a resin material, and is fastened and fixed to the motor protector 26 so as to be disposed along the bottom portion of the motor protector 26 and the inner circumferential side of the motor cover portion 26A. As a result, even when a stone flies in while the vehicle is running, this stone is prevented from directly hitting the motor 7, thereby protecting the motor 7.

Next, the connector bracket 29 will be described. The connector bracket 29 is formed into a substantially L shape. One side of the connector bracket 29 is integrally fastened to the compressor unit protector 12 by, for example, welding. The other side of the connector bracket 20 is disposed so as to have a space relative to the motor protector 26. An insertion hole 29A, through which a power source line 39 is inserted, is formed at the connector bracket 29. The power source line 39 is inserted through the insertion hole 29A. Although not illustrate, one side of the power source line 39 is connected to a battery of the vehicle. The other side of the power source line 39 is connected to a power source line 39A. The power source line 39A is connected to the motor 7, a power source line 39B connected to an air release electromagnetic valve 25 attached to the compressor 6 for releasing air, and a switching electromagnetic valve 32 for switching supply and release of the compressed air to and from the air suspension 2.

One side of the switching electromagnetic valve 32 is connected to a metallic air line 16A connected to the dryer 15. Further, the other side of the switching electromagnetic valve 32 is connected to flexible air tubes 16B and 16C, which supply and release the compressed air to and from the air suspension 2. The air tube 16B and the air tube 16C are connected to the air suspension 2 attached to the right side of the vehicle, and the air suspension 2 attached to the left side of the vehicle, respectively.

In this way, the compression apparatus is configured in such a manner that a vibration of the compressor 6, which is a vibration source, is prevented from being directly transmitted to the compressor unit protector 12 with the aid to the vibration absorbers 11, and further, the compressor unit protector 12 is fastened to the vehicle body side panel 21 via the fastening members 20 (20A and 20B). In other words, the compression apparatus is configured so as to doubly prevent transmission of a vibration.

Next, the fastening member 20 will be described, mainly with reference to FIGS. 4 to 10.

Figure 4:
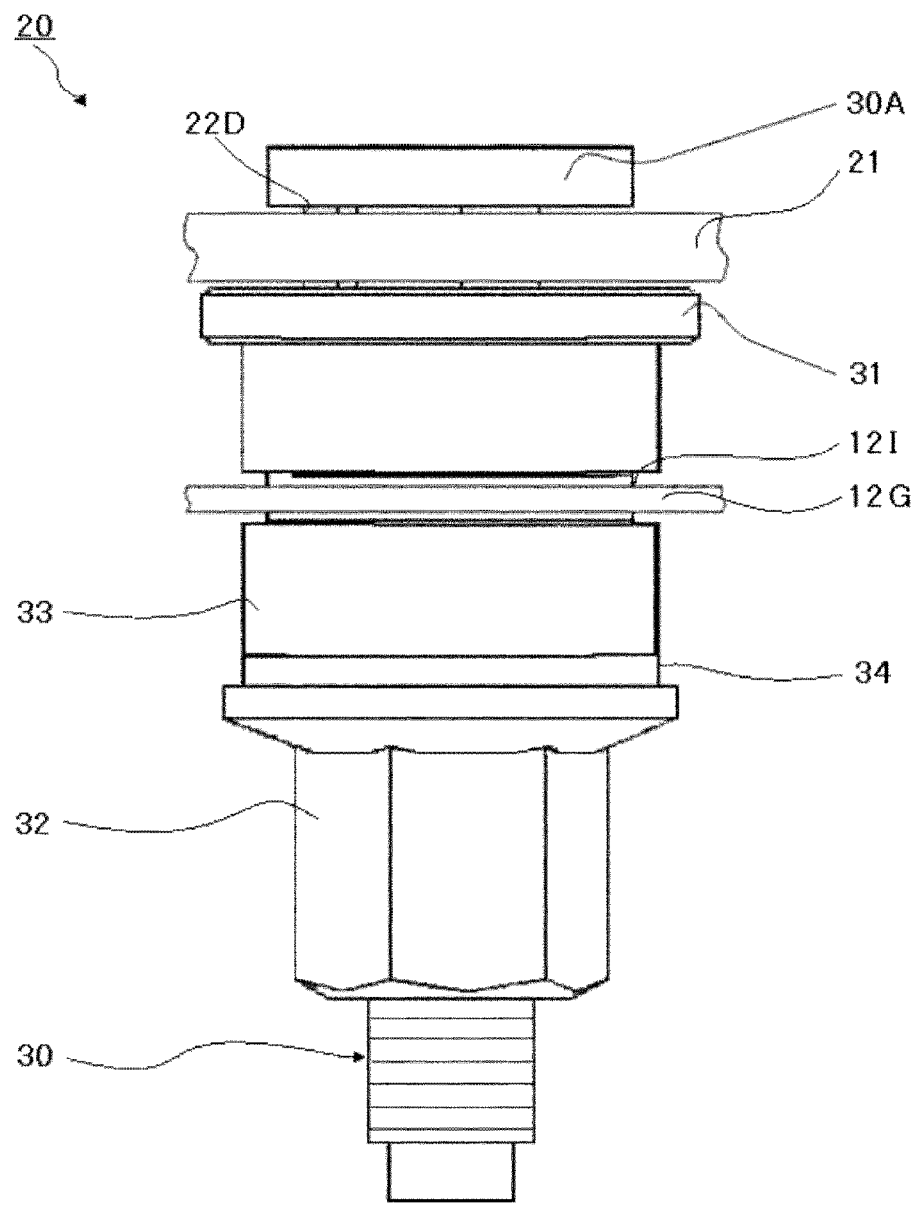
FIG. 4 is a front view of the fastening member according to the embodiment of the present invention.
Figure 5:
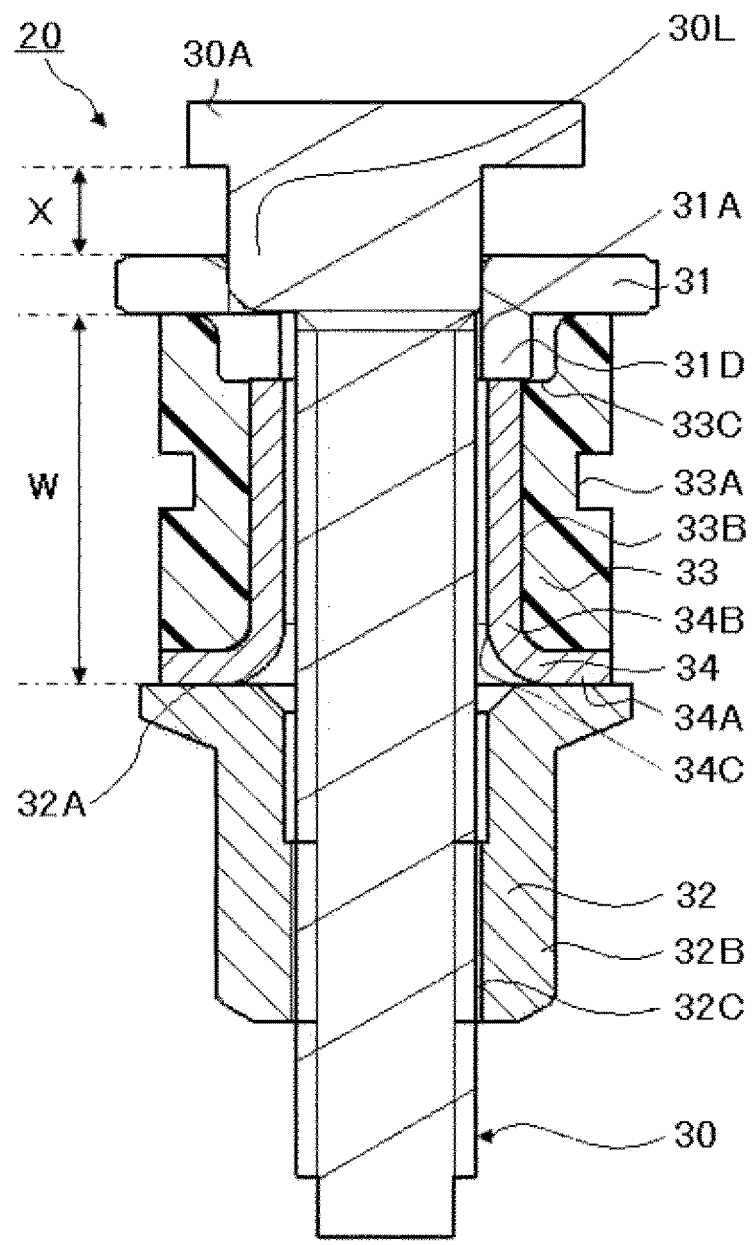
FIG. 5 is a vertical cross-sectional view of the fastening member according to the embodiment of the present invention.

The fastening member 20 includes a bolt 30, a washer 31, a nut 32, an elastic body 33, and a cylindrical member 34. Then, the fastening member 20 is inserted through an elongated hole 22C as the attachment hole of the vehicle body side panel 21 with the vehicle body side panel 21 sandwiched between a head portion 30A of the bolt 30 and the washer 31. Further, the fastening member 20 is coupled to the attachment hole 12I or 12J of the compressor unit protector 12 via the elastic body 33 of the fastening member 20. Next, the component parts of the fastening member 20 will be described in detail. FIG. 4 illustrates the fastening member 20 temporarily fixed without the nut 32 fastened completely.

Figure 6:
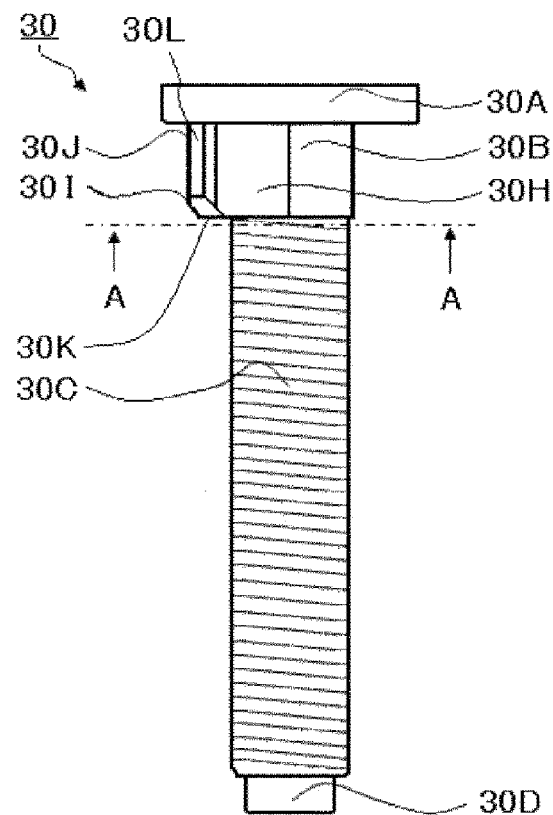
FIG. 6 is a front view of a bolt used for the fastening member according to the embodiment of the present invention.

As illustrated in FIG. 6, the bolt 30 includes the head portion 30A, a non-circular relative rotation prevention portion 30B, a threaded portion 30C, and a non-threaded portion 30D. The head portion 30A is formed at a proximal end side of the bolt 30 to be engaged with the vehicle body side panel 21 as the one side member. The relative rotation prevention portion 30B prevents a relative rotation between the attachment hole 22C and the washer 31. The threaded portion 30C is positioned at a distal end side of the bolt 30 and is externally threaded to form a male screw portion. The non-threaded portion 30D is positioned at the distal end side of the bolt 30, and is not externally threaded to form a male screw portion. The relative rotation prevention portion 30B, the threaded portion 30C, and the non-threaded portion 30D constitute a shaft portion.

Figure 7:
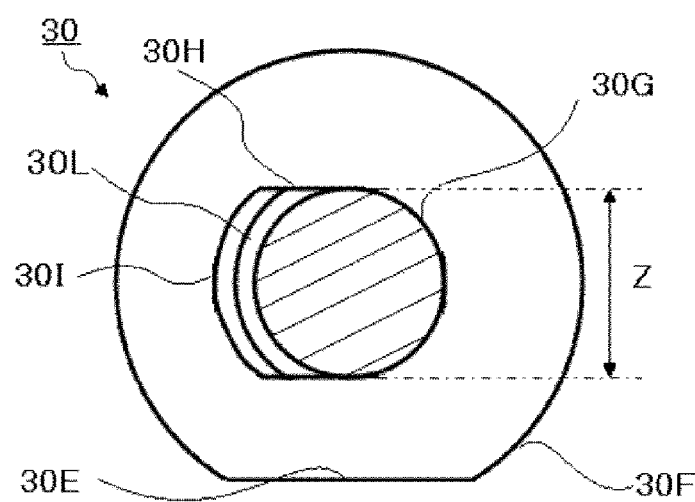
FIG. 7 is a cross-sectional view of the bolt used for the fastening member according to the embodiment of the present invention as viewed from the direction indicated by arrows A and A in FIG. 6.

As illustrated in FIG. 7, which is a cross-sectional view taken along a line A-A in FIG. 6, the contour of the head portion 30A includes a circular portion 30F and a cutout portion 30E. The cutout portion 30E is formed as a mark for positioning in a rotational direction, and extends in parallel with flat portions 30H. Therefore, the cutout portion 30E allows the orientation of the flat portion 30H to be recognized even from a direction lacking a view of the flat portion 30H by checking the cutout portion 30E as a visible portion. In this way, the cutout portion 30E improves the visibility. Further, as will be described below, the circular portion 30F is sized so as to be larger than a width length Y of the elongated hole 22C of an attachment portion 22 of the vehicle body side panel 21 but smaller than a circular hole 22A of the attachment portion 22 of the vehicle body side panel 21. Therefore, the circular portion 30F is shaped so as to be able to be inserted from the circular hole 22A. Further, the circular portion 30F is shaped so as to be unable to be pulled out from the elongated hole 22C to be engaged with the vehicle side panel 21, when being positioned in the elongated hole 22C.

The contour of the relative rotation prevention unit 30B includes a semicircular circular portion 30G, the flat portions 30H extending from the respective ends of the circular portion 30G, and an R-shaped portion 30I provided at the ends of the two flat portions 30H. These flat portions 30H and the R-shaped portion 30I form a radially extending protrusion portion 30L.

A plurality of knurled portions J in the form of vertical grooves is formed at the R-shaped portion 30I from the head portion 30A to the threaded portion 30C. The knurled portions J are formed to allow the washer 31 to be fixed to the relative rotation prevention portion 30B and to be maintained in a temporarily fixed state with a predetermined restraint force (resistance force) in the axial direction of the washer 31, after the relative rotation prevention portion 30B is press fitted in an insertion hole 31A of the washer 31, which will be described below. This restraint force is a restraint force (resistance force) of a strength allowing a movement depending on a fastened state of the nut 32 but preventing a movement from, for example, a vibration in a temporarily fixed state. It is desirable to provide the knurled portions J since they allow the bolt 30 to be easily press fitted in the washer 31 but prevent the washer 31 from being easily pulled out from the bolt 30, although the knurled portions J may be omitted.

The relative rotation prevention portion 30B serves to position the bolt 30 and prevent a rotation of the bolt 30 relative to the elongated hole 22C and the insertion hole 31A of the washer 31 due to the radially extending protrusion portion 30L. The contour of the threaded portion 30C is circular, and is externally threaded from the end of the relative rotation prevention portion 30B to the distal end side to form a male screw. In the present embodiment, the threaded portion 30C is configured to form a male screw from the relative rotation prevention portion 30B to the non-threaded portion 30D at the distal end along a whole length, but is not limited thereto. The threaded portion 30C may be externally threaded to form a male screw only on a portion where the nut 32 is screwed along.

Figure 8:
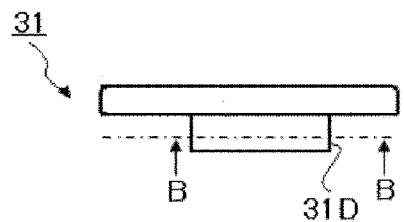
FIG. 8 is a washer used for the fastening member according to the embodiment of the present invention.
Figure 9:
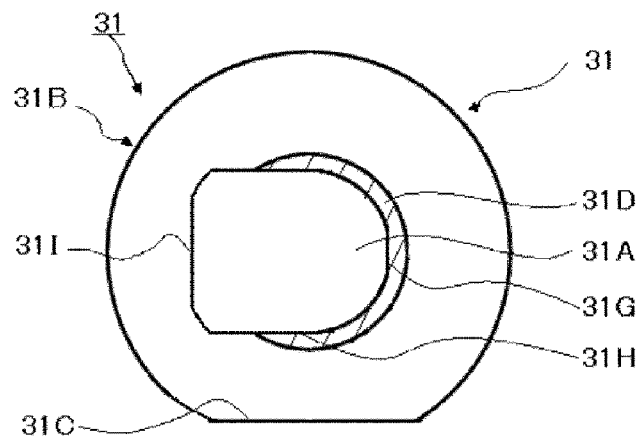
FIG. 9 is a cross-sectional view of the washer used for the fastening member according to the embodiment of the present invention as viewed from the direction indicated by arrows B and B in FIG. 8.

Next, the washer 31 will be described with reference to FIGS. 8 and 9. FIG. 8 is a front view illustrating the washer 31 alone. FIG. 9 is a cross-sectional view taken along a line B-B in FIG. 8.

The washer 31 includes a circular portion 31B. The contour of the circular portion 31B is larger in diameter than the head portion 30A of the bolt 30 and the elastic body 33. The contour of the washer 31 includes the circular portion 31B and a cutout portion 31C. The cutout portion 31C extends in parallel with flat portions 31H. Therefore, the cutout portion 31C is formed as a mark for positioning to allow the rotational direction to be recognized even in a state lacking a view of the flat portions 31H by checking the cutout portion 31C as a visible portion, thereby improving the visibility.

A fitting portion 31D, which is fitted to an inner circumferential side of the elastic body 33, is partially circumferentially formed at an inner circumferential side of the washer 31. The fitting portion 31D is fitted to the inner circumferential side of the elastic body 33, thereby facilitating assembling to improve the productivity. Further, when the nut 32 is screwed up, the fitting portion 31D is configured to be able to abut against the cylindrical member 34. Therefore, an axial force is introduced to the nut 32 via the cylindrical member 34, whereby it is possible to prevent the nut 32 from being loosened. Further, an axial dimension W is defined between the bottom portion 34A of the cylindrical member 34 and the circular portion 31B to allow the elastic body 33 to be axially positioned. Further, if necessary, the axial dimension of the elastic body 33 may increase so as to become larger than the axial dimension W, thereby allowing an axial compression force to be applied to the elastic member 33.

The present embodiment is configured in such a manner that the washer 31 includes the fitting portion 31D. However, the fitting portion 31D may be omitted. In this case, the cylindrical member 34 can be extended to a position placing the cylindrical member 34 into abutment with the washer 31, thereby allowing the axial force to be introduced. In this case, the assemblability is deteriorated to some degrees, but it is possible to provide a similar effect to the washer 31 having the fitting portion 31D.

Further, a through-hole 31A is formed at the inner circumferential side of the washer 31. The through-hole 31A includes the flat portions 31H, a circular portion 31G formed between ends of the two flat portions 31H, and a flat surface portion 31I in abutment with the relative rotation prevention portion 30B. The through-hole 31A has a substantially same shape as the relative rotation prevention portion 30B of the bolt 30 to allow the relative rotation prevention portion 30B to be press-fitted therein.

A circumferentially extending recess portion 33A is formed at an axially intermediate portion of an outer circumference of the elastic body 33. This recess portion 33A is fitted to the circumference of the insertion hole 12I or 12J of the compressor unit protector 12, by which the elastic body 33 is attached to the compressor unit protector 12. This elastic body 33 does not easily rotate only by a vibration due to a frictional force and a strained force of the recess portion 33A, when the elastic body 33 is attached to the compressor unit protector 12.

A through-hole 33B is formed at an inner circumferential side of the elastic body 33. The cylindrical member 34 is inserted in the through-hole 33B. The through-hole 33B has a substantially same diameter as the cylindrical member 34. In the present embodiment, the elastic body 33 is made of a rubber material such as a silicon rubber or a urethane rubber. The material and the spring constant of the elastic body 33 is appropriately changed according to a vibration frequency generated at the compressor 6, by which it is possible to further effectively absorb a vibration. Further, since a rubber material is used for the elastic body 33, the elastic body 33 can have a high friction coefficient against the compressor unit protector 12 made of a metallic material, thereby preventing the elastic body 33 from rotating relative to the insertion hole 12I or 12J. Further, a stepped portion 33C is formed at the inner circumferential side of the elastic body 33, and the fitting portion 31D is fitted to the stepped portion 33C, thereby improving the assemblability.

The cylindrical member 34 includes a circular bottom portion 34A and a cylindrical portion 34B. A through-hole 34C is formed at inner circumferential sides of the bottom portion 34A and the cylindrical portion 34B. Since the outer diameter of the through-hole 34C of the cylindrical member 34 is slightly larger than the inner diameter of the through-hole 33B of the elastic body 33, the elastic body 33 is installed to the cylindrical member 34 in a state press-fitted to the cylindrical member 34. The cylindrical member 34 functions to limit at least one of axial deformation and circumferentially inner deformation of the elastic body 33 (in the present embodiment, the cylindrical member 34 limits both of them), and transmit a torque for screwing up the nut 32 to the washer 31.

The nut 32 includes a flange portion 32A in abutment with the circular bottom portion 34A of the cylindrical member 34, and a hexagonal cylindrical portion 32B. A female screw portion 32C is formed at an inner circumferential side of the cylindrical portion 32B.

Figure 10:
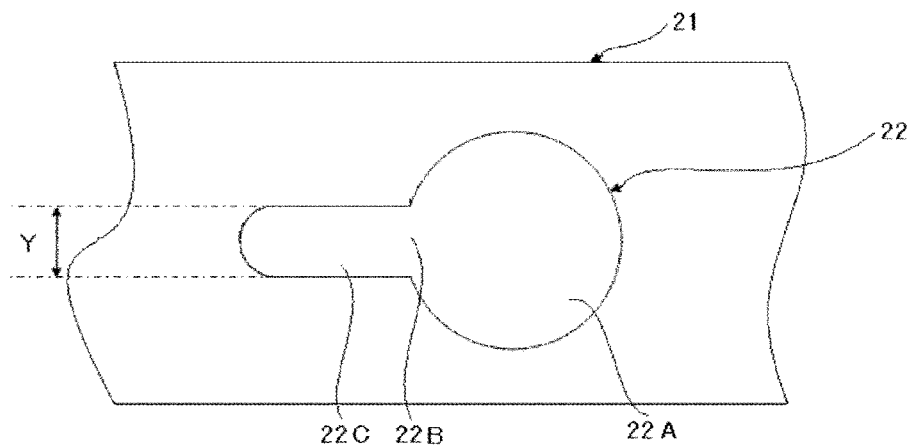
FIG. 10 illustrates an attachment hole of a vehicle body side panel according to the embodiment of the present invention as viewed from the top of FIG. 1.

Next, the attachment portion 22 of the vehicle body side panel 21, to which the fastening member 20 is installed, will be described with reference to FIG. 10. FIG. 10 is a top view of the structure illustrated in FIG. 1.

The attachment portion 22 generally includes the circular hole 22A and the elongated hole portion 22C. The elongated hole portion 22C extends from an opening portion 22B of the circular hole 22A to the left as viewed in FIG. 1, and corresponds to the attachment hole. A connection portion between the elongated hole portion 22C and the circular hole 22A forms the opening portion 22B. The circular hole 22A is formed so as to have a larger diameter than the outer diameter of the head portion 30A of the bolt 30, thereby allowing the head portion 30A to be inserted therethrough. The elongated hole 22C is formed in such a manner that the length Y of the elongated hole 22C in a width direction is substantially equal to or slightly longer than a length Z of the relative rotation prevention portion 30B in a width direction, and is shorter than a minimum diameter portion of the head portion 30A. Therefore, the bolt 30 is inserted in the circular hole 22A first, and is moved from the opening portion 22B into the elongated hole portion 22C, as a result of which the relative rotation prevention portion 30B is placed into abutment with the elongated hole portion 22C in the rotational direction to prevent a relative rotation of the bolt 30 to positionally fix the bolt 30. Further, since the head portion 30A is prevented from being pulled out from the elongated hole 22C, the bolt 30 can be also positionally fixed in the axial direction.

Next, an assembling procedure for installing the compressor unit 3 coupled to the compressor unit protector 12 to the vehicle body will be described with reference to FIG. 1.

First, the washer 31 is press fitted to the relative rotation prevention portion 30B of the bolt 30. At this time, the relative rotation prevention portion 30B and the insertion hole 31A of the washer 31 are fitted to each other with the rotational positions thereof, i.e., the respective flat portions 30H and 31H in alignment with each other, and the washer 31 is pushed in to reach a position of a distance X from the head portion 30A. The distance X from the head portion 30A is a slightly longer distance than the thickness of the vehicle body side panel 21. This press-fitting of the washer 31 to the bolt 30 can realize positioning of the bolt 30 and the washer 31 in the rotational direction and positioning of the fastening member 20 relative to the vehicle body side panel 21 in the axial direction.

Next, the elastic body 33 is inserted in the insertion hole 12I or 12J of the compressor unit protector 12, and this insertion is continued until the elastic body 33 reaches such a position that the recess portion 33A of the elastic body 33 is fitted to the insertion hole 12I or 12J. After that, the cylindrical member 34 is inserted in the inner circumferential hole 33B of the elastic body 33 from below. As a result, the elastic body 33 becomes unable to be deformed in the inner circumferential direction, thereby preventing the elastic body 33 from being pulled out from the insertion hole 12I or 12J.

After that, the bolt 30 with the washer 31 press-fitted thereto is inserted in the through-hole 33B of the elastic body 33 (the through-hole 34C of the cylindrical member 34) from above the compressor unit protector 12. At this time, the insertion is adjusted in such a manner that the cutout portion 30E formed at the head portion 30A is positioned at the front side in the front-back direction of the sheet of FIG. 1, and this realizes smooth insertion into the elongated hole portion 22C of the attachment portion 22 from the circular portion 30G of the bolt 30 at the time of attachment to the vehicle. A mark indicating the orientation of the cutout portion 30E is formed at the compressor unit protector 12 by, for example, pressing, by which it becomes easy to make the respective members face the same direction.

Finally, the nut 32 is attached around the bolt 30 from below to temporarily fix the fastening member 20 to the compressor unit protector 12. At this time, the washer 31 is press-fitted to the relative rotation prevention portion 30B to be fixed with a predetermined restraint force in the axial direction, so the nut 32 is screwed by a force that does not lead to application of a force equal to or stronger than this restraint force. As a result, the fastening member 20 is temporarily fixed to the compressor unit protector 12 with the distance X maintained between the washer 31 and the head portion 30A of the bolt 30. The resultant product is sent to an automobile assembly line in this state.

In the automobile assembly line, in such a state that the fastening members 20 (20A and 20B) are temporarily fixed to the insertion holes 12I and 12J of the compressor unit protector 12, respectively, the compressor unit 3 is installed to the vehicle body side panel 21 from below. First, the compressor unit 3 is moved upward so as to insert the head portion 30A of the bolt 30 through the circular hole 22A of the attachment portion 22. After the insertion of the head portion 30A, the compression unit 3 is axially moved, as a result of which the washer 31 comes to abut against the surrounding area of the circular hole 22A since the washer 31 is larger in diameter than the outer diameter of the circular hole 22A. After the compressor unit 3 reaches this position, the compressor unit 3 is pushed to slide toward the elongated hole portion 22C of the attachment portion 22 (to the left as viewed in FIG. 1).

At this time, a worker cannot see what is going on above the vehicle body side panel 21 since the vehicle body side panel 21 obstructs a view except for the attachment portion 22. However, the bolt 30 in the temporarily fixed state is oriented so as to enable smooth insertion of the circular portion 30G of the bolt 30 into the elongated hole portion 22C of the attachment portion 22, so the compressor unit 3 can be positioned at an attachment position of the vehicle body by being pushed to slid the compressor unit 3 to a position where the vibration absorbing bush 23 is press-fitted in the hole 12K of the compressor unit protector 12.

Even if the bolt 30 rotates and the orientation changes during transportation, a worker can reposition the compressor unit 3 relative to the vehicle body side panel 21 in the rotational direction with use of the flat portion of the washer 31 visible from below the vehicle body side panel 21, i.e., the visible portion.

Lastly, the nut 32 is screwed up, and therefore a torque for this screwing up is applied to the cylindrical member 34 and the washer 31 to fix the compressor unit 3 with the area surrounding the elongated hole portion 22C of the vehicle body side panel 21 sandwiched between the head portion 30A and the washer 31. The knurled portions 30J are formed at the relative rotation prevention unit 30B, which makes it possible to press-fit and temporarily fix the washer 31 to the relative rotation prevention portion 30B. Further, the nut 32, the cylindrical member 34, and the protrusion portion 31D of the washer 31 are in contact with one another without any space therebetween in the axial direction, so it is possible to sufficiently transmit the torque for screwing up the nut 32.

At this time, the washer 31 is press-fitted around the relative rotation prevention portion 30B, so it is possible to prevent occurrence such a situation that the washer 31 may be detached from the relative rotation prevention portion 30B with their rotational directions out of alignment with each other, and then the nut 32 may be screwed up at a position in abutment with a bottom surface 30K of the relative rotation prevention portion 30B, resulting in a failure to sandwich the area surrounding the elongated hole 22C between the washer 31 and the head portion 30A.

Further, the washer 31 is press-fitted around the relative rotation prevention portion 30B, and the washer 31 is larger in diameter than the outer diameter of the circular hole 22A, so it is possible to axially position the compressor apparatus relative to the vehicle body side panel 21.

The above-described embodiment is only an exemplary embodiment of the present invention. A possible modification thereof will be described below.

The above-described embodiment has been described based on an example in which the fastening member according to the present invention is used with the compressor apparatus to be mounted on the vehicle. However, the one side member is not limited to the vehicle, and may be any of, for example, various kinds of apparatuses, a house, and various kinds of casings. The opposite side member may be desirably a member that generates a vibration, and can be an apparatus including a driving means such as a motor and an engine.

Further, the above-described embodiment has been described based on an example in which the one side member is the vehicle, and the opposite side member is the compressor unit protector 12. However, they may be exchanged. In this case, the present invention can be realized by, for example, providing the fastening member 20 at the vehicle side, and providing the attachment portion 22 to the compressor unit protector 12.

The above-described embodiment has been described based on an example in which the attachment hole 22 generally includes the circular hole 22A and the elongated hole 22C extending from the circular hole 22A. However, the present invention is not limited thereby. The present invention can be realized by any attachment portion including an attachment hole capable of preventing the head portion 30A of the bolt 30 from being pulled out therefrom, and an opening portion capable of receiving insertion of the bolt 30 with the nut and the like attached thereto. For example, the attachment hole may be formed in such a manner that an end of the plate member is used as the end of the elongated hole 22C, and this end is treated as the opening portion. In this case, the bolt 30 is inserted from the end of the plate member, so the compressor unit 3 can be attached by only moving the compressor unit 3 in the horizontal direction.

In the above-described embodiment, the cutout portion 31C is formed at the washer 31 to allow the orientation of the rotation prevention portion 30B to be recognized from below. Instead, a mark such as a cutout may be formed at the non-threaded portion 30D to allow the orientation of the relative rotation prevention portion 30B to be recognized.

Further, in the above-described embodiment, the elastic body 33 and the cylindrical member 34 are provided. However, they may be omitted if prevention of a vibration is not necessary.

Figure 11:
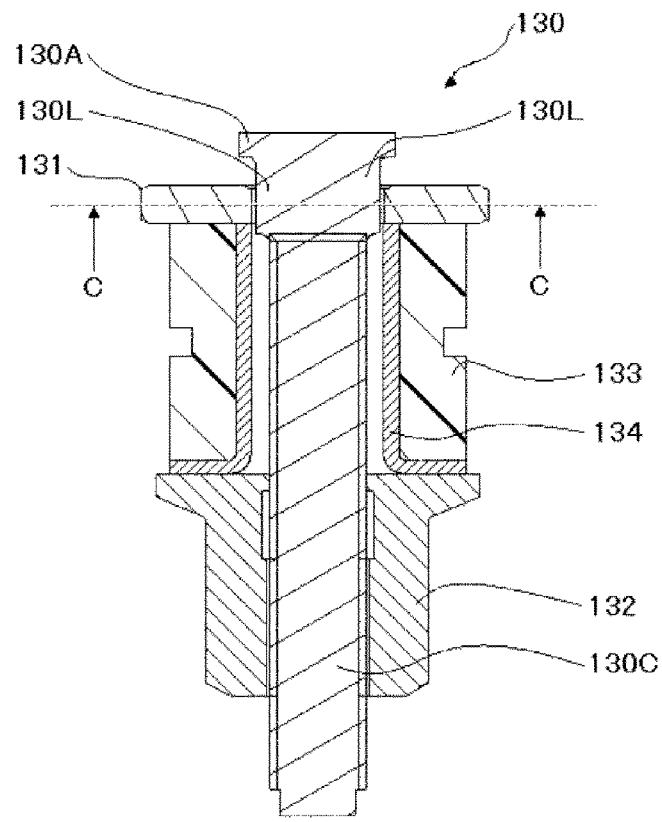
FIG. 11 is a vertical cross-sectional view of a fastening member according to a modification of the embodiment of the present invention.
Figure 12:
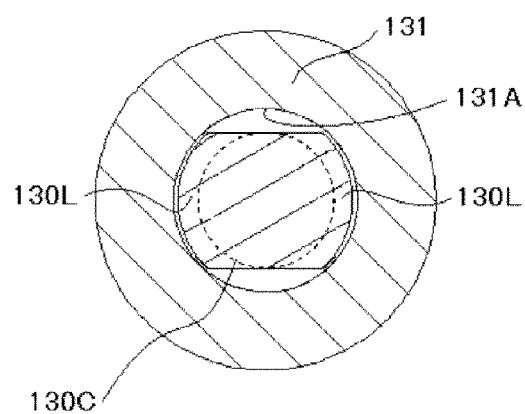
FIG. 12 is a cross-sectional view of the fastening member according to the modification of the embodiment of the present invention as viewed from the direction indicated by arrows C and C in FIG. 11.

Further, the above-described embodiment may be modified as illustrated in FIGS. 11 and 12. In FIGS. 11 and 12, similar members to the above-described embodiment are indicated by the same reference numerals as the above-described embodiment with a value of 100 added thereto, and the detailed descriptions thereof will be omitted below.

In the above-described embodiment, the bolt 30 includes the radially extending protrusion portion 30L only at one side. However, in this modification, a bolt 130 includes radially extending protrusion portions 130L at both sides. As a result, a central axis of a washer 131 and a central axis of a threaded portion 130C of the bolt 130 can be coaxial even if a through-hole 131A of the washer 131 is circular.

In this way, in the above-described embodiment, the through-hole 31A of the washer 31 has the same shape as the relative rotation prevention portion 30B, but the through-hole of the washer may be differently shaped from the relative rotation prevention portion as long as the washer can be press fitted to the relative rotation prevention portion.

Further, in this modification, the washer 131 is inexpensive disk having a simple annular shape. Further, an upper end surface of a cylindrical member 134 is shaped to be extended to abut against a bottom surface of the washer 131 to facilitate transmission of an axial force of a nut 132.

According to the fastening member and the compressor apparatus of the above-described embodiment, it is possible to improve assemblability. Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Applications No. 2012-082036, filed on Mar. 30, 2012.

The entire disclosure of Japanese Patent Applications No. 2012-082036, filed on Mar. 30, 2012 including specification, claims, drawings and summary is incorporated herein by reference in its entirety.

What is claimed is:

1. A fastening system comprising:
a one side member including a non-circular attachment hole having an opening portion formed at a part of a circumference of the non-circular attachment hole;
an opposite side member including an insertion hole; and
a fastening member for use in coupling between the one side member and the opposite side member
wherein the fastening member comprises:
a bolt including
a shaft portion configured to be inserted in the attachment hole from the opening portion of the attachment hole and having a male screw formed at least a distal end side of the shaft portion, and
a head portion formed at a proximal end side of the shaft portion and configured so as to be unable to pass through the attachment hole in an axial direction of the shaft portion when the shaft portion is inserted through the attachment hole, the shaft portion being configured in such a manner that the opposite side member is attached to the shaft portion;
a washer including a through-hole, through which the shaft portion of the bolt is inserted, the washer being configured to sandwich the one side member between the washer and the head portion; and
a nut configured to be screwed with the male screw of the bolt and configured to couple the one side member and the opposite side member,
wherein the shaft portion of the bolt includes a non-circular relative rotation prevention portion at a head portion side of the shaft portion, the relative rotation prevention portion being configured to abut against the non-circular attachment hole in a rotational direction to prevent a relative rotation between the bolt and the one side member.

2. The fastening system according to claim 1, wherein the washer is press fitted to the relative rotation prevention portion.

3. The fastening system according to claim 1, wherein the through-hole of the washer is non-circular and is configured to be engaged with the relative rotation prevention portion of the bolt in the rotational direction, by which a relative rotation is prevented between the bolt and the washer.

4. The fastening system according to claim 1, wherein a cylindrical elastic body, through which the bolt is inserted, is disposed between the washer and the nut, and the opposite side member is attached via the elastic body.

5. The fastening system according to claim 4, wherein a cylindrical member is disposed in a hole of the elastic body, through which the bolt is inserted, and the cylindrical member is configured to transmit an axial force input from the nut to the washer and limit at least axial deformation of the elastic body.

6. The fastening system according to claim 1, wherein a visible portion is formed on at least one of the washer and the bolt, and the visible portion is configured to provide visibility of a rotational position relative to the one side member.

7. The fastening system according to claim 1, wherein the shaft portion is inserted through the attachment hole of the one side member in a temporarily fixed state, in which the washer is spaced apart from the head portion by a distance corresponding to a thickness of the one side member or more and is press fitted to the relative rotation prevention portion of the shaft portion.

8. A compressor apparatus comprising:
a compression unit configured to compress air;
a frame to which the compression unit is attached, the frame including an insertion hole;
an attachment target member including a non-circular attachment hole having an opening portion formed at a part of a circumference of the non-circular attachment hole;
a fastening member for use in coupling between the frame and the attachment target member,
wherein the fastening member comprises:
a cylindrical elastic body configured to be inserted in the insertion hole to be engaged with the insertion hole at an outer circumference thereof;
a bolt configured to be inserted in the elastic body, and including a head portion formed at a proximal end side of a shaft portion and a male screw formed at a distal end side of the shaft portion;
a nut configured to be screwed with the male screw of the bolt; and
a washer including a through-hole, through which the shaft portion of the bolt is inserted, the washer being configured to sandwich an area surrounding the non-circular attachment hole formed at the attachment target member between the washer and the head portion,
wherein the shaft portion of the bolt includes a non-circular relative rotation prevention portion at a head portion side of the shaft portion, the relative rotation prevention portion being configured to abut against the non-circular attachment hole in a rotational direction to prevent a relative rotation between the bolt and the attachment target member.

9. The compressor apparatus according to claim 8, wherein the washer is press fitted to the relative rotation prevention portion.

10. The compressor apparatus according to claim 8, wherein the through-hole of the washer is non-circular and is configured to be engaged with the relative rotation prevention portion of the bolt in the rotational direction, by which a relative rotation is prevented between the bolt and the washer.

11. The compressor apparatus according to claim 8, wherein the elastic body is disposed between the washer and the nut and includes a circumferentially extending recess portion, and the recess portion is fitted to a circumference of the insertion hole, by which the elastic body is attached to the frame.

12. The compressor apparatus according to claim 8, wherein a cylindrical member is disposed in a hole of an elastic body, through which the bolt is inserted, and the cylindrical member is configured to transmit an axial force input from the nut to the washer and limit at least axial deformation of the elastic body.

13. The compressor apparatus according to claim 8, wherein a visible portion is formed on at least one of the washer and the bolt, and the visible portion is configured to provide visibility of a rotational position relative to the attachment target member.

14. The compressor apparatus according to claim 8, wherein the shaft portion is inserted through the attachment hole of the attachment target member in a temporarily fixed state, in which the washer is spaced apart from the head portion by a distance corresponding to a thickness of the attachment target member or more and is press fitted to the relative rotation prevention portion of the shaft portion.

15. A compressor apparatus comprising:
- a compression unit configured to compress air;
- a frame to which the compression unit is attached;
- an insertion hole formed at the frame;
- a cylindrical elastic body configured to be inserted in the insertion hole to be engaged with the insertion hole at an outer circumference thereof,
- a bolt configured to be inserted in the elastic body, and including a head portion formed at a proximal end side of a shaft portion and a male screw formed at a distal end side of the shaft portion;
- a nut configured to be screwed with the bolt; and
- a washer including a through-hole, through which the shaft portion of the bolt is inserted, the washer being configured to be prevented from rotating relative to the bolt and to sandwich an area surrounding a non-circular attachment hole formed in an attachment target member, to which the frame is attached, between the washer and the head portion,
- wherein the shaft portion of the bolt includes a non-circular relative rotation prevention portion at a head portion side of the shaft portion, the relative rotation prevention portion being configured to abut against the non-circular attachment hole in a rotational direction to prevent a relative rotation between the bolt and the attachment target member, and
- wherein a cylindrical member is disposed in a hole of an elastic body, through which the bolt is inserted, and the cylindrical member is configured to transmit an axial force input from the nut to the washer and limit at least axial deformation of the elastic body.

16. The compressor apparatus according to claim 15, wherein the washer is press fitted to the relative rotation prevention portion.

17. The compressor apparatus according to claim 15, wherein the through-hole of the washer is non-circular and is configured to be engaged with the relative rotation prevention portion of the bolt in the rotational direction, by which a relative rotation is prevented between the bolt and the washer.

18. The compressor apparatus according to claim 15, wherein the elastic body is disposed between the washer and the nut and includes a circumferentially extending recess portion, and the recess portion is fitted to a circumference of the insertion hole, by which the elastic body is attached to the frame.

19. The compressor apparatus according to claim 15, wherein the a visible portion is formed at least one of the washer and the bolt, and the visible portion is configured to provide visibility of a rotational position relative to the attachment target member.

20. The compressor apparatus according to claim 15, wherein the shaft portion is inserted through the attachment hole of the attachment target member in a temporarily fixed state, in which the washer is spaced apart from the head portion by a distance corresponding to a thickness of the attachment target member or more and is press fitted to the relative rotation prevention portion of the shaft portion.

\* \* \* \* \*